(12) United States Patent
Hata et al.

(10) Patent No.: US 6,768,632 B2
(45) Date of Patent: Jul. 27, 2004

(54) ALUMINUM ELECTROLYTIC CAPACITOR AND METHOD OF MANUFACTURING THE SAME

(75) Inventors: Toshiyuki Hata, Kyoto (JP); Yoshinori Oe, Kyoto (JP); Nario Niibo, Osaka (JP); Makoto Uemura, Kyoto (JP); Tsuyoshi Yoshino, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/648,278

(22) Filed: Aug. 27, 2003

(65) Prior Publication Data

US 2004/0095709 A1 May 20, 2004

(30) Foreign Application Priority Data

Aug. 28, 2002 (JP) ........................................ 2002-248251

(51) Int. Cl.[7] .................................................. H01G 9/00
(52) U.S. Cl. ...................... 361/523; 361/509; 361/516; 361/525; 361/528; 361/529
(58) Field of Search ................................. 361/523, 508, 361/509, 512, 516, 520, 524, 525, 528, 530, 532, 579, 503; 29/25.03

(56) References Cited

U.S. PATENT DOCUMENTS

| 4,876,451 | A | * | 10/1989 | Ikeda et al. | .................. 361/540 |
| 5,366,515 | A | * | 11/1994 | Kunugihara et al. | ........ 29/25.03 |
| 6,310,756 | B1 | * | 10/2001 | Miura et al. | .............. 361/301.3 |
| 6,452,784 | B2 | * | 9/2002 | Nakada et al. | .............. 361/509 |
| 6,711,000 | B2 | * | 3/2004 | Takeishi et al. | ............. 361/523 |

* cited by examiner

Primary Examiner—Anthony Dinkins
Assistant Examiner—Nguyen T. Ha
(74) Attorney, Agent, or Firm—Wenderoth, Lind & Ponack, L.L.P.

(57) ABSTRACT

The present invention aims to address a problem of contact failure likely to occur in the joint between an internal lead and an external terminal and to provide a reliable aluminum electrolytic capacitor. To this end, an aluminum electrolytic capacitor of the present invention is structured so that a through-hole provided through an internal lead has a diameter smaller than the outer diameter of an aluminum rivet and the peripheral edge of this through-hole is drawn to provide a cylindrical portion integral with the through-hole.

14 Claims, 6 Drawing Sheets

ALUMINUM ELECTROLYTIC CAPACITOR AND METHOD OF MANUFACTURING THE SAME

BACKGROUND OF THE INVENTION

1. Field of the Invention

The present invention relates to an aluminum electrolytic capacitor having external terminals for use in various kinds of electronic equipment and to a method of manufacturing the capacitor.

2. Background Art

FIG. 5 is a sectional view illustrating a structure of a conventional aluminum electrolytic capacitor. FIG. 6 is a sectional view of an essential part of the conventional capacitor. FIG. 7 is a sectional view of an essential part of the conventional capacitor before a rivet thereof is upset. Capacitor element 10 shown in FIGS. 5 through 7 is structured so that a positive electrode foil (not shown) and a negative electrode foil (not shown) are rolled, sandwiching a separator (not shown) therebetween. The positive electrode foil has dielectric surface oxide layers formed by anodizing an aluminum foil having roughened surfaces. The negative electrode foil is made of an aluminum foil having roughened surfaces.

The method of assembling a conventional aluminum electrolytic capacitor is outlined hereinafter. A conventional aluminum electrolytic capacitor includes aluminum internal leads 11, i.e. one connected to the positive electrode foil at one end and the other to the negative electrode foil at one end, terminal plate 12, a pair of external terminals 13 provided on this terminal plate 12, aluminum rivets 14, and aluminum spacers 15. In a manufacturing process, external terminals 13 are fixed to terminal plate 12 by corresponding aluminum rivets 14. At the same time, the tip portion of each aluminum rivet 14 penetrating through this terminal plate 12 and projecting therefrom is threaded through through-hole 110 previously provided at the other end of each of internal leads 11, via spacer 15. After another spacer 15 is further fitted on the rivet, the tip portion of aluminum rivet 14 projecting from the other spacer 15 is upset. With these steps, internal leads 11 and corresponding external terminals 13 are electrically connected with each other. Through-hole 110 previously provided at the other end of each internal lead 11 is formed to have opening diameter $\phi C$ slightly larger than outer diameter $\phi D$ of aluminum rivet 14, in consideration of workability.

Further, this capacitor element 10 and an electrolyte solution (not shown) are contained in cylindrical metal case 16 having a bottom. Attached to the outer peripheral surface of this metal case 16 is resin sleeve 161 made of vinyl chloride. At last, the periphery of the opening of this metal case 16 is drawn so as to surround this terminal plate 12, to seal the metal case. Thus, an aluminum electrolytic capacitor having a pair of external terminals 13 is constructed.

In a conventional aluminum electrolytic capacitor, a pair of internal leads 11 drawn from capacitor element 10 are electrically connected to a pair of external terminals 13 provided on terminal plate 12 by threading corresponding through-holes 110 provided at the other ends of internal leads 11 with aluminum rivets 14 and then upsetting the tip portions of aluminum rivets 14. At this time, each of through-holes 110 is formed to have opening diameter $\phi C$ slightly larger then outer diameter $\phi D$ of aluminum rivet 14, in consideration of workability. For this reason, connection between internal lead 11 and external terminal 13 depends on the contact between aluminum rivet 14 and the flat portion of internal lead 11 or part of through-hole 110 where aluminum is exposed by punching.

However, internal lead 11 connected to the positive electrode foil has dielectric oxide layers formed on the surfaces thereof by anodic oxidation. This has posed an inherent drawback: even when the surfaces of internal lead 11 are in contact with aluminum spacers 15, it is difficult to provide electrical connection therebetween. Additionally, as an aluminum electrolytic capacitor continues to be used, the electrolyte solution entering into through-holes 110 having exposed aluminum surfaces chemically reacts with the aluminum and the reaction produces oxide layers on the exposed aluminum surfaces. As a result, it becomes more difficult to provide electrical connection. This has posed a problem of malfunction caused by contact failure.

SUMMARY OF THE INVENTION

The present invention addresses these conventional problems and aims to provide a reliable aluminum electrolytic capacitor in which electrical connection between internal leads and external terminals are ensured.

In order to attain these objects, an aluminum electrolytic capacitor of the present invention includes: (a) a capacitor element structured so that a positive electrode foil and a negative electrode foil are rolled, sandwiching a separator therebetween, (b) internal leads, i.e. one connected to the positive electrode foil at one end and the other to the negative electrode foil at one end, (c) a cylindrical metal case having a bottom for containing this capacitor element together with a electrolyte solution, (d) a pair of external terminals each coupled to the other end of one of the internal leads, and (e) a terminal plate disposed in an opening of the metal case and sealing the metal case. The other end of each of the internal leads has a through-hole. Provided around the peripheral edge of this through-hole is a cylindrical portion formed integral with the internal lead by drawing. While this cylindrical portion is threaded with an aluminum rivet for fixation of the external terminal and the inner peripheral surface of the cylindrical portion is in contact with the outer peripheral surface of the aluminum rivet, the tip portion of the aluminum rivet is upset. Thus, the external terminals provided on the terminal plate are electrically connected to the corresponding internal leads.

In a method of manufacturing an aluminum electrolytic capacitor of the present invention, a punch having a smaller diameter part at its tip, and a dice having a hole for receiving the smaller diameter part therein are used. By lowering the punch, a prepared hole is drilled at one end of each of aluminum internal leads connected to the positive electrode foil or the negative electrode foil. By successively lowering the punch, the prepared hole is drawn to form a cylindrical portion integral with the prepared hole.

Additional objects and advantages of the present invention will be apparent from the following detailed description of a preferred embodiment thereof, which is best understood with reference to the accompanying drawings.

DETAILED DESCRIPTION OF THE INVENTION

Initially considered to address the conventional problems is a trial of making a cross-shaped cut instead of a through-hole in an internal lead, forcibly piercing this cut with an aluminum rivet, and upsetting the tip portion thereof In such a method, a new problem has arisen. The tip portions of the cross-shaped cut are broken and resulting fragments induce short circuits. Thus, a more fundamental solution must be sought.

The present invention addresses such a problem and provides a fundamental solution that causes no new problems. The present invention can provide a reliable aluminum electrolytic capacitor in which electrical connection between internal leads and external terminals is ensured.

An aluminum electrolytic capacitor in accordance with an exemplary embodiment of the present invention is specifically described with reference to the accompanying drawings.

Figure 1:
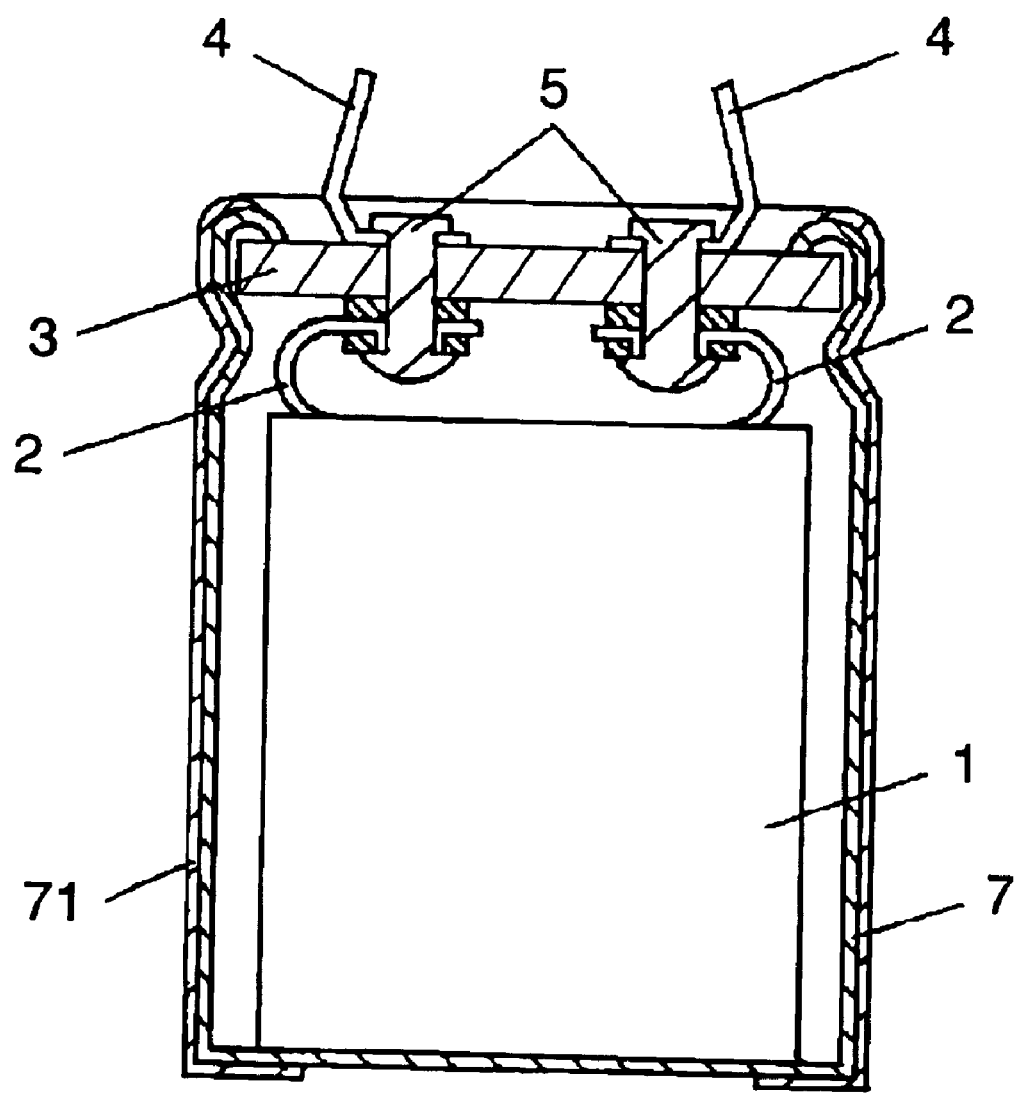
FIG. 1 is a sectional view illustrating a structure of an aluminum electrolytic capacitor in accordance with an exemplary embodiment of the present invention.
Figure 2A:
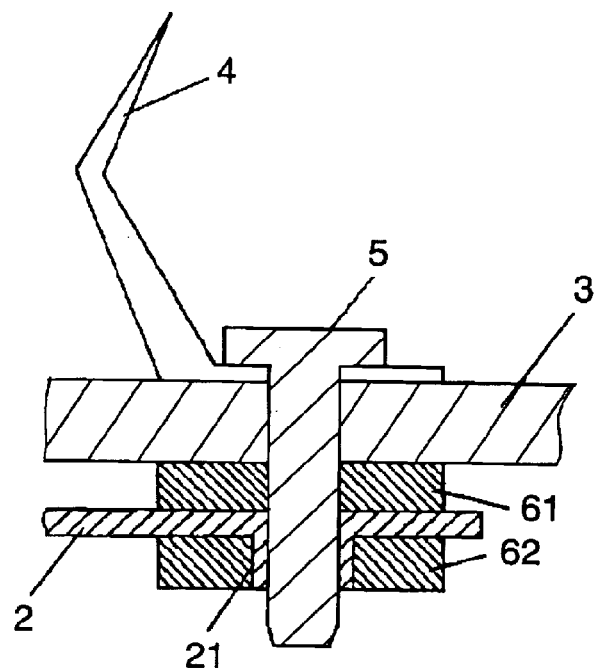
FIG. 2A is a sectional view illustrating the aluminum electrolytic capacitor in accordance with the exemplary embodiment of the present invention before a rivet thereof is upset.
Figure 2B:
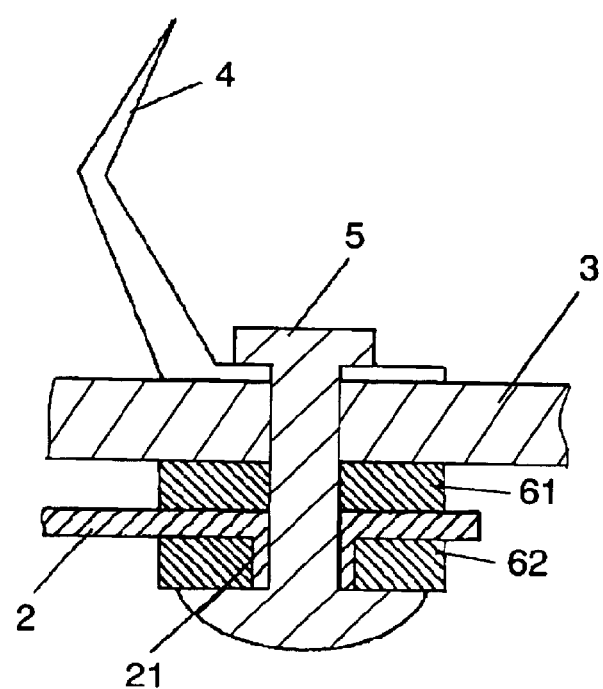
FIG. 2B is a sectional view illustrating the aluminum electrolytic capacitor in accordance with the exemplary embodiment of the present invention after the rivet thereof is upset.
Figure 3:
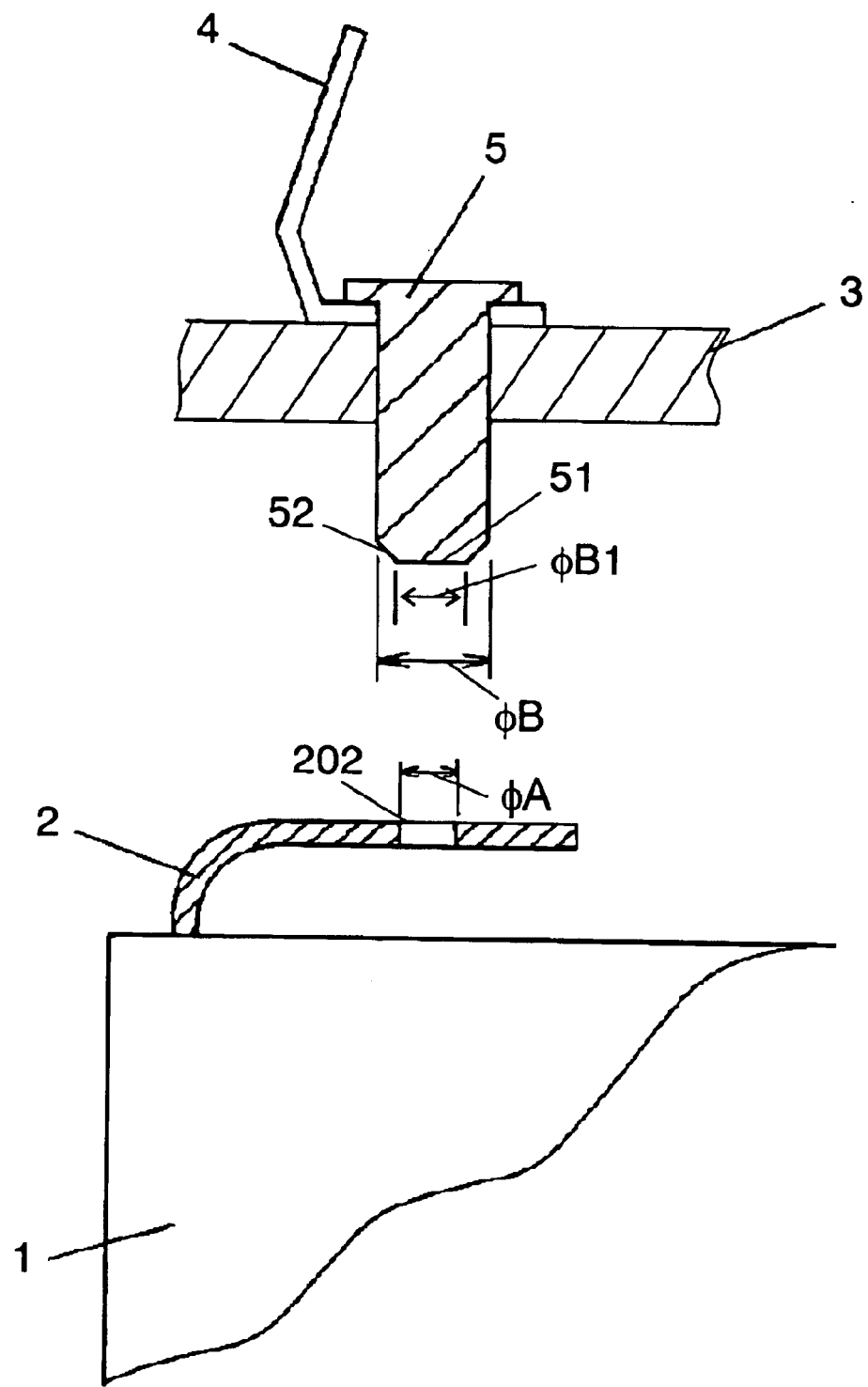
FIG. 3 is a sectional view of an essential part of the aluminum electrolytic capacitor in accordance with the exemplary embodiment of the present invention.

Capacitor element 1 shown in FIGS. 1 through 3 is structured so that a positive electrode foil (not shown) and a negative electrode foil (not shown) are rolled, sandwiching a separator (not shown) therebetween. The positive electrode foil has dielectric surface oxide layers formed by anodizing an aluminum foil having roughened surfaces. The negative electrode foil is made of an aluminum foil having roughened surfaces.

An aluminum electrolytic capacitor of this embodiment includes aluminum internal leads 2, i.e. one connected to the positive electrode foil at one end and the other to the negative electrode foil at one end, cylindrical portions 21 each provided integral with through-hole 202 formed through this internal lead 2, terminal plate 3, a pair of external terminals 4 provided on this terminal plate 3, aluminum rivets 5, and aluminum spacers 61 and 62. Aluminum rivets 5 fixes corresponding external terminals 4 to terminal plate 3. At the same time, the tip portion of each aluminum rivet 5 penetrating through this terminal plate 3 and projecting therefrom is threaded through cylindrical portion 21 that is formed around through-hole 202 previously provided at the other end of internal lead 2, via spacer 61. Further, another spacer 62 is fitted on the rivet. By upsetting the tip portion of each aluminum rivet 5 projecting from the other spacer 62, internal leads 2 and corresponding external terminals 4 are fixed and electrical connection is ensured therebetween.

This capacitor element 1 is contained in cylindrical metal case 7 having a bottom, together with an electrolyte solution (not shown). Attached to the outer peripheral surface of this metal case 7 is resin sleeve 71 made of vinyl chloride. The periphery of the opening of this metal case 7 is drawn so as to surround this terminal plate 3, to seal the metal case. With these steps, an aluminum electrolytic capacitor having a pair of external terminals 4 is constructed.

As shown in FIG. 3, through-hole 202 previously provided at the other end of internal lead 2 is formed to have opening diameter φA smaller than outer diameter φB of aluminum rivet 5. In this embodiment, opening diameter φA of through-hole 202 provided at the other end of internal lead 2 is set to 1.0 mmφ. Outer diameter φB of aluminum rivet 5 is set to 2.3 mmφ. In other words, through-hole 202 is formed to have opening diameter φA that is 43.5% of outer diameter φB of aluminum rivet 5.

Figure 4A:
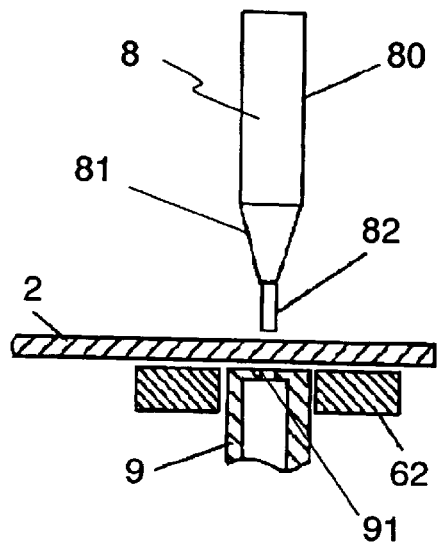
FIGS. 4A, 4B, and 4C are drawings illustrating the process of manufacturing the aluminum electrolytic capacitor in accordance with the exemplary embodiment of the present invention.
Figure 4B:
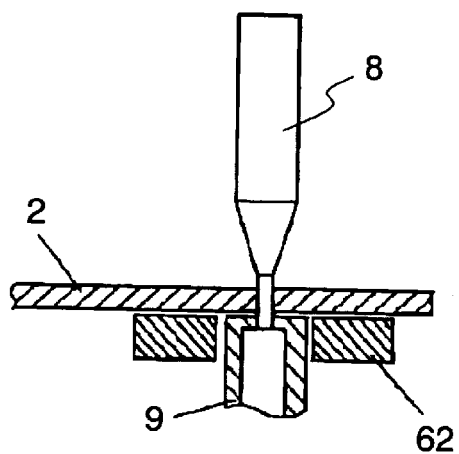
Figure 4C:
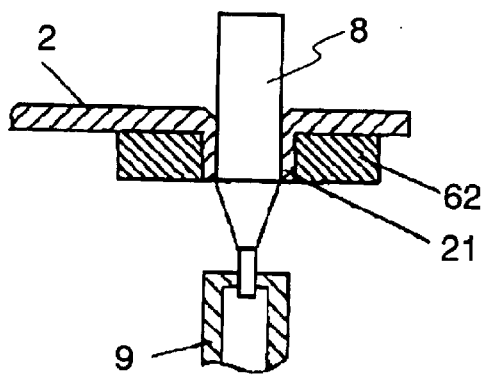
Figure 5:
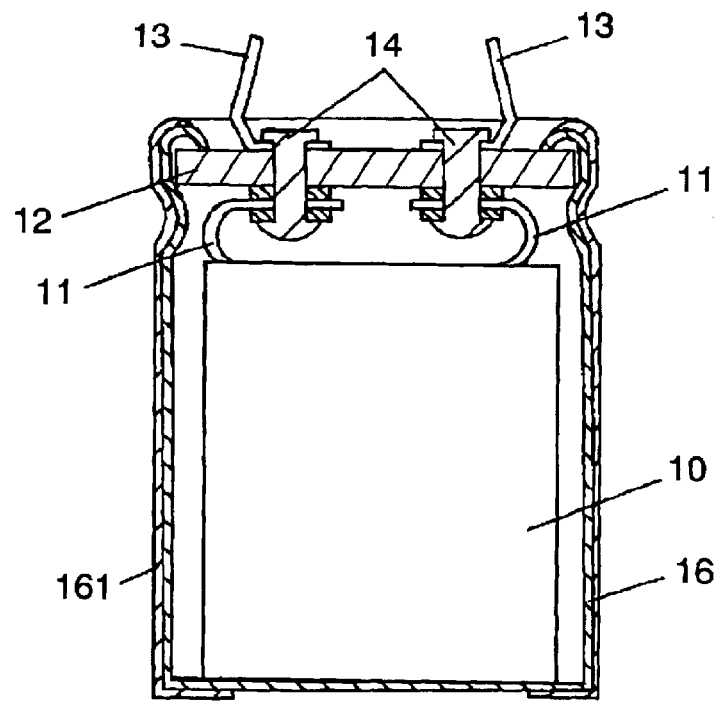
FIG. 5 is a sectional view illustrating a structure of a conventional aluminum electrolytic capacitor.
Figure 6:
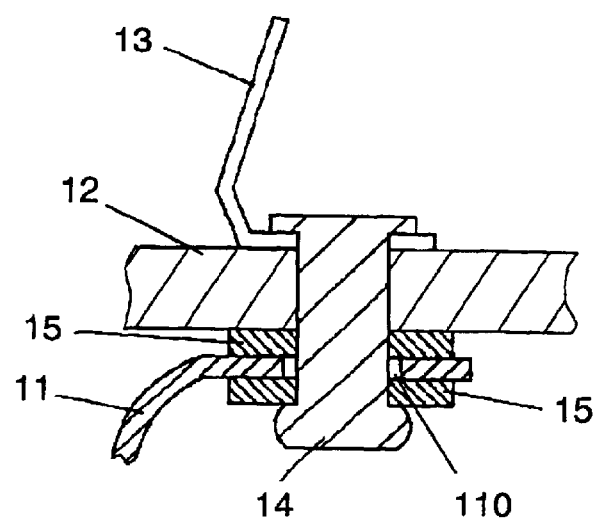
FIG. 6 is a sectional view of an essential part of the conventional aluminum electrolytic capacitor.
Figure 7:
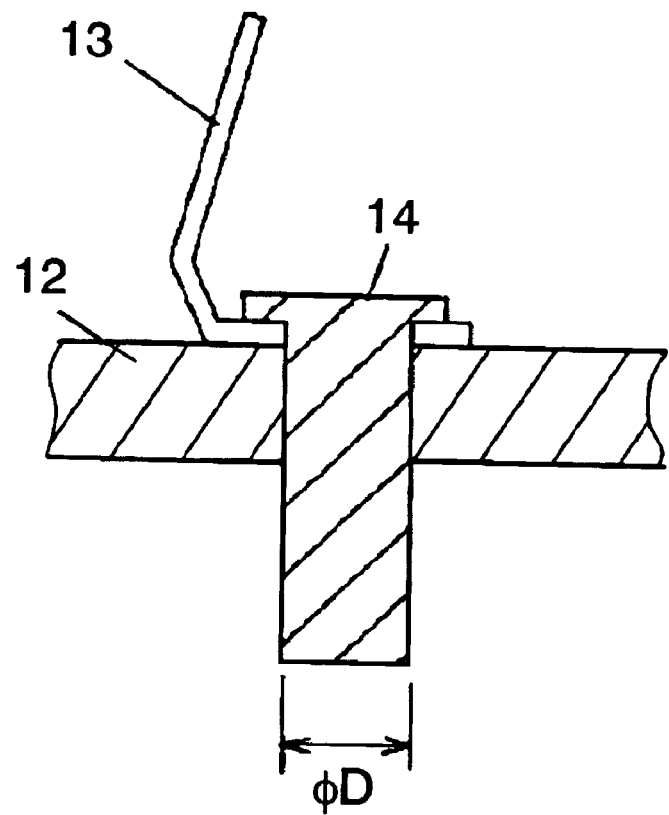
FIG. 7 is a sectional view of an essential part of the conventional aluminum electrolytic capacitor before a rivet thereof is upset.
Figure 7:
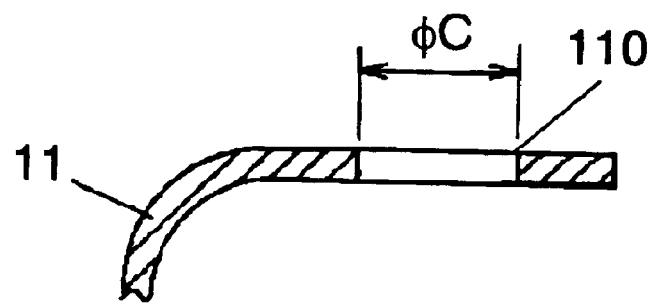

FIGS. 4A, 4B, and 4C illustrate a manufacturing process of providing through-hole 202 through internal lead 2 and forming cylindrical portion 21 integral with this though hole 202, in this embodiment. As shown in the drawings, punch 8 is formed so that the outer diameter of body part 80 is 2.3 mmφ, which is equal to outer diameter φB of aluminum rivet 5. The punch has smaller diameter part 82 at the tip thereof via taper 81. This smaller diameter part 82 is formed to have an outer diameter of 1.0 mmφ, which is equal to opening diameter φA of through-hole 202. In a position opposite to punch 8 with respect to an internal lead, dice 9 having a hole 91 for receiving smaller diameter part 82 of punch 8 therein is disposed. FIG. 4A shows how internal lead 2 is disposed on spacer 62. FIG. 4B shows how punch 8 is lowered to drill a prepared hole through internal lead 2. FIG. 4C shows how punch 8 is further lowered to draw the prepared hole drilled through internal lead 2 and form cylindrical portion 21 using body part 80 of the punch. FIGS. 4A through 4C illustrate how to form cylindrical portion 21 integral with through-hole 202 through internal lead 2. This method is performed by a series of operations.

In this embodiment, through-hole 202 (opening diameter: φA) previously provided at the other end of internal lead 2 is formed to have a diameter smaller than outer diameter φB of aluminum rivet 5. At the same time, the peripheral edge of this through-hole 202 is drawn to form cylindrical portion 21 integral with the through-hole.

Next, cylindrical portion 21 is threaded with aluminum rivet 5 and the tip portion of aluminum rivet 5 is upset. Thus, internal lead 2 and aluminum rivet 5 are electrically connected. At this time, upsetting is performed while the inner peripheral surface of cylindrical portion 21 is in contact with the outer peripheral surface of aluminum rivet 5. This ensures electrical connection between internal lead 2 and external terminal 4 via aluminum rivet 5 and allows stable production of reliable aluminum electrolytic capacitors.

Aluminum electrolytic capacitor samples (400V, 100 μF) were produced so that through-holes 202 each previously provided at the other end of each internal lead 2 have different opening diameters φA. One hundred samples were produced for each opening diameter. After superpose prescribed ripple current tests were conducted at a temperature of 110° C. (3,000 hours), the reliability of connection was evaluated for each sample group. Table 1 shows the results of evaluation.

In Table 1, opening diameter ratio $R_{A/B}$ of the opening diameter of through-hole 202 to the outer diameter of aluminum rivet 5 is expressed by the following equation:

$$R_{A/B} = (\phi A/\phi B)*100 \qquad \text{(Equation 1)}$$

Opening diameter ratio $R_{A/B}$ is expressed as a percentage. The columns of the test results show the kind of failures and the number of defective samples.

TABLE 1

| $R_{A/B}$ (%) | Before test (number of defective samples) | After test (number of defective samples) |
|---|---|---|
| 20 | Short circuits (5) | OK |
| 30 | Short circuits (3) | OK |
| 40 | OK | OK |
| 50 | OK | OK |
| 60 | OK | OK |
| 70 | OK | OK |
| 80 | OK | Faulty connections (1) |
| 90 | OK | Faulty connections (2) |
| 100 | OK | Faulty connections (3) |
| 110 | Faulty connections (3) | Faulty connections (5) |

As obvious from Table 1, when the opening diameter ratio of opening diameter ϕA of through-hole 202 previously provided through internal lead 2 to outer diameter ϕB of aluminum rivet 5 is up to 30%, short circuits occur. This is because through-hole 202 is broken when a prepared hole drilled through internal lead 2 is drawn, using punch 8, to integrally form cylindrical portion 21, and resulting fragments induce the short circuits. On the other hand, in samples having an opening diameter ratio not smaller than 80%, faulty connections occur. This is because the area to be drawn is insufficient when a prepared hole drilled through internal lead 2 is drawn, using punch 8, to integrally form cylindrical portion 21. As a result, through-hole 202 deforms non-uniformly, and the deformation induces the faulty connections.

As a result of the tests conducted, it is found that optimum opening diameter ratio $R_{A/B}$ ranges from 40 to 70%.

Additionally, tip portion 51 of this aluminum rivet 5 may have taper 52. As for the shape of taper 52, it is preferable to set outer diameter ϕB1 of tip portion 51 of aluminum rivet 5 equal to or smaller than opening diameter ϕA of through-hole 202. Providing taper 52 makes it easy to thread aluminum rivet 5 through through-hole 202 provided through inner lead 2 and improves workability.

As discussed above, in an aluminum electrolytic capacitor of the present invention, a through-hole previously provided at the other end of an internal lead is formed to have a diameter smaller than the outer diameter of an aluminum rivet, preferably a diameter that is 40 to 70% of the outer diameter of the aluminum rivet. Additionally, the peripheral edge of this through-hole is drawn to form a cylindrical portion integral with the through-hole. As a result, when the internal lead and an external terminal are electrically connected by threading the aluminum rivet through the through-hole and then upsetting the tip portion of the rivet, upsetting is performed with the inner peripheral surface of the cylindrical portion in contact with the outer peripheral surface of the aluminum rivet. This gives special advantages of ensuring electrical connection between the internal lead and external terminal and stable production of reliable aluminum electrolytic capacitors.

It will be obvious to those skilled in the art that various changes may be made in the above-described embodiment of the present invention. However, the scope on the present invention should determined by the following claims.

What is claimed is:

1. An aluminum electrolytic capacitor comprising:

an internal lead having one end coupled to an electrode foil and the other end having a through-hole;

a spacer in contact with the other end of said internal lead 2 and having a through-hole in the contact portion;

a terminal plate having a through-hole for fixing said internal lead;

an external terminal fixed to said terminal plate; and an aluminum rivet penetrating through said external electrode, said terminal plate, said spacer, and said internal lead, a tip portion of said rivet capable of being upset;

wherein said internal lead has a cylindrical portion around the through-hole of said internal lead.

2. The aluminum electrolytic capacitor of claim 1, further comprising a metal case for containing the electrode foil and said internal lead, wherein said metal case is sealable by drawing an opening of said metal case around a periphery of said terminal plate.

3. The aluminum electrolytic capacitor of claim 1, comprising the cylindrical portion disposed in a space between said rivet and the through-hole of said spacer.

4. The aluminum electrolytic capacitor of claim 1, further comprising another spacer disposed between said internal lead and said terminal plate.

5. The aluminum electrolytic capacitor of claim 1, wherein the cylindrical portion has an inner diameter substantially equal to an outer diameter of said rivet, and an outer diameter substantially equal to an inner diameter of the through-hole of said space.

6. The aluminum electrolytic capacitor of claim 1, wherein the cylindrical portion is formed by drawing a peripheral edge of the through-hole through said internal lead.

7. A method of manufacturing an aluminum electrolytic capacitor, using a punch having a smaller diameter part at a tip thereof, and a dice having a hole for receiving the smaller diameter part of the punch, said method comprising the steps of:

lowering the punch on one end of an aluminum internal lead to form a small hole therethrough, the internal lead being coupled to one of a positive electrode foil and a negative electrode foil; and successively lowering the punch to draw the small hole and form a cylindrical portion integral with the small hole.

8. The method of manufacturing an aluminum electrolytic capacitor of claim 7, said aluminum electrolytic capacitor comprising: an external terminal, a terminal plate, a spacer, an internal lead, an aluminum rivet penetrating through above components for upsetting, said method comprising the step of:

forming the cylindrical portion on the internal lead, using the punch having a body part and the smaller diameter part, and the dice having a hole having an inner diameter slightly larger than the smaller diameter part of the punch, said step of forming the cylindrical portion comprising the sub-steps of:

drilling a small hole through one end portion of the internal lead using the smaller diameter part of the punch; and drawing the small hole to form the cylindrical portion around the small hole, using the body part of the punch.

9. The method of manufacturing an aluminum electrolytic capacitor of claim 8, wherein the smaller diameter part of the punch is fitted into the hole of the dice after said drilling sub-step, and during said drawing sub-step, the state of being fitted into the hole is maintained.

10. The method of manufacturing an aluminum electrolytic capacitor of claim 8, wherein said drawing sub-step is a step of forming the internal lead into a cylindrical shape between a through-hole of the spacer and the body part of the punch.

11. The method of manufacturing an aluminum electrolytic capacitor of claim 8, wherein an outer diameter of the smaller diameter part of the punch is 40 to 70% of an outer diameter of the body part.

12. The method of manufacturing an aluminum electrolytic capacitor of claim 8, wherein a taper is provided between the smaller diameter part and the body part of the punch.

13. The method of manufacturing an aluminum electrolytic capacitor of claim 8, further comprising an upsetting step, said upsetting step using a rivet having a taper at a tip portion thereof, and comprising sub-steps of: inserting the tip portion of the rivet into the cylindrical portion, and upsetting the tip portion after insertion.

14. The method of manufacturing an aluminum electrolytic capacitor of claim 7, wherein a diameter of the small hole is 40 to 70% of an outer diameter of the aluminum rivet.

* * * * *